Figure 1:
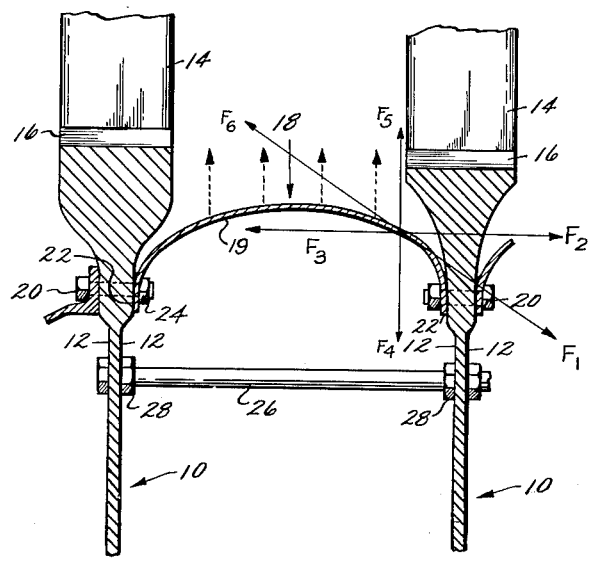

Oct. 2, 1962  M. BOBO  3,056,579
ROTOR CONSTRUCTION
Filed April 13, 1959

INVENTOR.
MELVIN BOBO
BY
Harry C. Burgess
ATTORNEY

United States Patent Office 3,056,579
Patented Oct. 2, 1962

3,056,579
ROTOR CONSTRUCTION
Melvin Bobo, Cincinnati, Ohio, assignor to General Electric Company, a corporation of New York
Filed Apr. 13, 1959, Ser. No. 806,147
4 Claims. (Cl. 253—39.15)

This invention relates to rotors used in turbomachinery and, more particularly, to members that join blade supporting disks of axial-flow compressor or turbine rotors.

The construction of axial-flow compressor and turbine rotors usually includes a plurality of blade carrying disks and cylindrical members that join these disks to form the rotor assembly. These cylindrical members are the main structural element of the rotor providing support for the disks which are situated between the rotor bearings. In addition to their support function, the cylindrical members transmit torque to or from the blades or air foils supported by the various disks.

Besides the purely mechanical functions of these cylindrical joining members, it is common practice to utilize them to perform an aerodynamic function, i.e., the cylindrical members often provide portions of aerodynamic seals used to separate gases of various pressure levels existing in adjoining stages of the rotor. The configuration of the cylindrical members is, therefore, often critical to the successful operation of the rotor. This is particularly true of lightweight, high-speed turbine rotors where design conditions may require that the aerodynamic seals be located at or near the periphery of the disks, where operating temperatures are usually high. Due to the presence of these high temperatures and the possibility that the cylindrical members will be of large diameter, it is difficult to design such members with sufficiently low inherent stresses to prevent their failure at high rotational speeds.

It should be mentioned that the cylindrical members acquire support primarily in two ways, that is, from centrifugally-induced, circumferentially-extending "hoop" stresses, generally in tension (i.e., tending to pull apart), and from edge support adjacent the disks. As is usual in the case of lightweight turbomachinery, the disk support is effective only near the cylinder's edge and the middle portion, or center-span, of the member derives the majority of its support from the "hoop" stresses. The cylindrical member is, therefore, subject to substantial bending stresses extending in a generally axial direction with respect to the rotor. When such a cylinder is rotated at high speed in a zone of high temperature the combined stresses, including principally the "hoop" stresses, which, in addition to being centrifugally-induced, may be temperature and/or pressure induced also, become too great for the member to withstand.

Accordingly, it is an object of my invention to provide a disk-joining member for use in turbomachinery, the member having an inherent low stress factor to better enable it to withstand the combined stresses associated with high speed compressor and turbine rotor operation.

A further object of my invention is to provide a composite disk-joining member for use in high temperature zones of turbomachinery rotors, the member being adapted to perform both a structural function and a non-structural, heat-shielding function in the rotor due to the member having an inherent low stress factor to enable it to better withstand the combined stresses associated with high speed operation of lightweight, axial-flow compressor and turbine rotors.

Briefly stated, in accordance with one embodiment of my invention, I provide a composite disk-joining member for a turbomachine rotor, said member comprising a first annular portion having a predetermined "catenary" configuration in order that it may have low rigidity to forces applied in a generally axial (i.e., non-radial) direction with respect to the rotor, and a second portion in the form of an axially-aligned stiffening member, which member provides the rigidity necessary in lightweight, high speed rotor construction.

Figure 2:
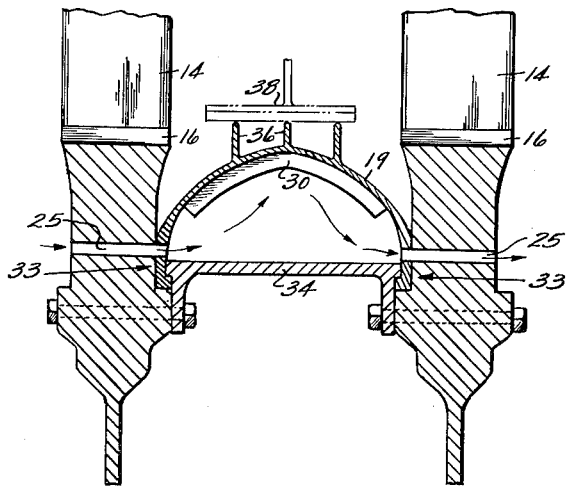
Figure 3:
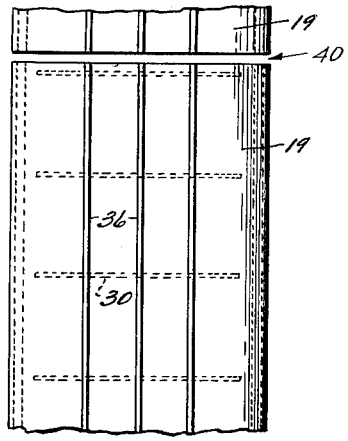

Although I particularly point out and distinctly claim my invention at the end of this specification, it will perhaps be better understood and other objects and advantages become more apparent from the following description in which:

FIGURE 1 is a cross-section of a turbine rotor showing the composite disk-joining member wherein both portions of the member perform a structural function, the figure also indicating some of the forces acting on the "catenary" member during rotation and, FIGURE 2 is a cross-section of the composite member wherein one portion of the member performs a non-structural, heat-shielding function, the member also having means for cooling and sealing, and FIGURE 3 is a fragmentary top-plan view of the composite member with the "catenary" portion of the member being constructed in segments and functioning as a heat-shield.

My invention is shown being utilized in a turbine rotor but it is obvious that it could equally be utilized in a compressor rotor.

As shown in FIG. 1, the turbine rotor comprises a plurality of spaced apart disks indicated generally at 10, having radially extending walls 12—12. Each disk supports a plurality of turbine blades 14, affixed to the disk periphery at 16 by any suitable locking means.

In the embodiment shown in FIG. 1, the first portion of my composite disk-joining member is indicated generally at 18. This first portion may be described as a substantially channel-shaped annulus, the central span 19 of which is arch-like in cross-section. This arched center span has a predetermined "catenary" configuration for a purpose hereinafter described. The annulus or "catenary" first portion 18 is adapted to be positioned between the walls 12—12 of successive rotor disks and is secured to the walls, adjacent the disk peripheries, by any suitable fastening means. In the embodiment shown, the fastening means comprise threaded bolts 20 adapted to be inserted through holes in extensions 22 which are provided on either side of the central section 19 of the annulus. The extension holes are adapted to be aligned with similar holes in the disks to enable the disks and this first portion of the composite disk-joining member to be securely fastened together by means of the bolts 20 and nuts 24.

The second portion of the composite disk-joining member is adapted to be positioned radially inward from the annulus or "catenary" portion. This second portion functions as a rigid stiffening device and may take the form of a plurality of circumferentially-spaced, axially aligned rods, one of which is shown at 26 in FIG. 1. The stiffening rod 26 may be attached to the disks by any suitable means, such as by threading the rods, inserting them in holes in the disks, and using nuts 28 to affix the rods to the disks. In any event, the second portion is placed in a less critical position than the "catenary" portion of the disk-joining member, i.e., at a smaller diameter and/or in a cooler environment.

It is apparent, on reading the above, that my invention utilizes the well established principle of the "catenary" shape. Webster's dictionary defines a "catenary" configuration as a "proper curve for an arch of equilibrium." Such a curve occurs when a perfectly flexible, inextensible cord of uniform weight is supported between two rigidly spaced apart points with the cord being under the "equilibrium" of a given force. Since my composite disk-joining member is adapted to be utilized in an axial-flow compressor or turbine rotor, it will become subject to an "equilibrium" force which is at least partially induced by rotation. Under design conditions and at "normal" rotor speeds, this force will cause the "catenary" portion of the member to develop stresses extending in a generally axial (i.e., non-radial) direction (in addition to the aforementioned "hoop" stresses), which contribute to the support of this portion of the member.

To better understand the function of the "catenary" portion, consider the support of the mid-span section of an electrical transmission line or a suspension bridge. The middle portion of either span is supported from rigid towers through a wire or wires that are in tension. Three important mechanical features common to both of these familiar arrangements are: (a) the towers are rigidly separated; (b) the mid-span sections are not dependent on rigidity of the wires for support, although there is some rigidity introduced as a result of tension; and (c) the tensioned members in both arrangements are relatively flexible and of a continually increasing inclination as they approach the support towers. Although the "catenary" portion of my composite disk-joining member is designed to rotate and has a more complicated configuration than the "catenary" shape defined in Webster or that illustrated by the above examples, many of the same mechanical principles apply.

For example, the center-span of the "catenary" portion derives a substantial amount of its support, during rotation, through development of tensile stresses in that portion. Furthermore, like the wires of the non-rotating examples mentioned above, the curve of the "catenary" portion is of a continually changing inclination from midway of the center-span to the junctions of the center-span with the extensions 22. In addition, the "catenary" portion has its steepest rate of inclination adjacent the extensions (affixed to the disks), which is similar to the configuration found in the above-mentioned examples. The disks are rigidly separated by means of the second portion of my composite member in a manner substantially equivalent to the way in which the towers of the bridge and transmission lines are separated. Since the catenary-portion is utilized in a rotating device, it is, of course, subject to the centrifugally-induced hoop stresses, mentioned above, which aid in supporting it.

Therefore, if an "optimum" curve for the "catenary" portion is selected, based on the desired level of stress for "normal" operation under certain speed, temperature, and pressure conditions, the resultant stress, disregarding for the moment the aforementioned circumferentially oriented hoop stresses, at any one point along the surface of the "catenary" portion will necessarily be in tension, the direction of the stress or force extending tangential to the surface of the catenary portion and either parallel to or passing through the axis of rotation. As a result of obtaining this type of stress, the tendency for the "catenary" portion to develop the axially-directed bending stresses, which are so destructive of ordinary cylindrical joining members, is eliminated.

To state it another way, by building the "catenary" portion of the composite disk-joining member to the "optimum" shape described above, a more efficient means of supporting the mid-span section of the "catenary" portion can be provided. This is accomplished as a result of the centrifugal, heat and/or pressure induced loads of that section being transferred to the disks primarily as tension loads, rather than as bending loads. Any given segment of the "catenary" portion of my composite member will, therefore, be in "equilibrium," i.e., not subject to bending, with the forces (in tension) acting in a plane of the surface of the portion at that point.

The state of stress described above is often referred to as a "membrane" state of stress. This desirable state of stress may be indicated pictorially by means of a force diagram, as is shown in FIG. 1. In the drawing $F_1$ and $F_6$ are vectors, equal and opposite in direction, which depict the tensile load acting at a given point on the surface of the "catenary" portion of the member, which load is obtained by use of the "optimum" shape described above. $F_1$ and $F_6$ may also be described in terms of their axial and radial components. Thus, the radial components are forces $F_4$ and $F_5$, respectively, and the axial components are forces $F_2$ and $F_3$, also respectively. Forces, or vectors $F_2$ and $F_3$, therefore depict a state of tension in the catenary portion 18 which, if not balanced, would tend to pull the disks together. The axial tensile forces $F_2$ and $F_3$ are, however, reacted by compressive forces developed in the rigid stiffening member 26. As mentioned above, $F_5$ results primarily from high-speed rotation but may include temperature and/or pressure induced loads. Note that since the second portion 26 of the composite member is positioned radially inward of the first portion, it is not subject to the same stresses and/or temperatures encountered by the "catenary" portion which, in fact, will act to shield the second portion from heat.

As described above, both portions of the composite member perform structural functions necessary to the rotor construction. However, use of a composite member having a "catenary" portion is not limited to those applications where the "catenary" portion of the member is necessarily required to perform a structural function. For example, as shown in FIGS. 2 and 3, the "catenary" portion could be used solely as a heat shield for a second, stiffening portion 34. The "catenary" portion may also be equipped with a plurality of cooling fins 30 positioned on its underside and extending either axially (as shown) or circumferentially of the rotor. Aligned passageways 25 in the rotor disks and the "catenary" portion may also be provided to admit air for cooling the composite member. When so constructed and arranged, the "catenary" portion no longer functions as a structural member, since it is merely held in position by the second portion 34. The holding means may be of any suitable configuration, such as the flange arrangement indicated generally at 33. The second portion 34, positioned as shown in FIG. 2, may have the standard cylindrical spacer form well known in compressor and turbine rotor design.

In either of its structural or non-structural functions, the "catenary" portion may be provided with fluid sealing means, such as the outwardly-extending projections 36, shown in FIG. 2, which rotate with the portion. The projections are adapted to coact with a stationary sealing member 38 affixed to the turbine nozzle casing.

When certain disk-joining member configurations are used in conjunction with certain operating temperatures and rotor speeds the "hoop" stresses, mentioned above, can become compressive, as opposed to tensile, stresses. Where the "catenary" portion of the member is being utilized solely as heat-shield, i.e., in a non-structural manner, it may be desirable, in some instances, to eliminate these compressive stresses. This can be accomplished by manufacturing the "catenary" portion in segments, as shown in FIG. 3. In assembling the rotor, the individual segments are attached to the disks leaving slight gaps, indicated generally at 40, between each segment to allow for expansion of the segments as they heat up during rotor operation.

It is to be understood that the invention is not limited to the specific embodiment illustrated herein but may be used in other ways without departing from the spirit of the invention as described in the following claims:

I claim:
1. An axial flow turbomachine rotor including:
   a plurality of axially-spaced, blade carrying disks;
   at least one annular heat shield, said shield having a cross-section of predetermined catenary configuration; and
   a plurality of fastening means attaching said shield to a pair of disks adjacent the peripheries thereof,
   said annular heat shield having low rigidity in the axial direction whereby the shield will develop tensile stresses in the plane of the catenary during normal operation of the rotor, said tensile stresses being transmitted through said fastening means to the disks, so as to substantially eliminate bending stresses in the shield.

2. In a turbomachine rotor:
a plurality of axially-spaced, blade-carrying disks;
means for joining said disks adjacent the peripheries thereof comprising
 (a) an annular first disk-joining portion having a cross-section of predetermined catenary configuration, and
 (b) means for attaching said first portion to said disk peripheries,
said first portion having low rigidity in the axial direction whereby it will develop tensile stresses in the plane of the catenary during normal operation of the rotor, said tensile stresses being transmitted through said fastening means to the disks so as to eliminate bending stresses in said first portion; and
 (c) a second disk joining portion disposed radially inwardly from said first portion,
said second portion having high rigidity in the axial direction and being rigidly affixed to said disks for maintaining the axial spacing thereof.

3. In a turbomachine rotor:
a plurality of axially-spaced, blade-carrying disks;
means for joining said disks adjacent the peripheries thereof comprising
 (a) annular first disk-joining portion having a cross-section of predetermined catenary configuration, and
 (b) means for attaching said first portion to said disk peripheries,
said first portion having low rigidity in the axial direction whereby it will develop tensile stresses in the plane of the catenary during normal operation of the rotor, said tensile stresses being transmitted through said fastening means to the disks so as to eliminate bending stresses in said first portion; and
 (c) a second disk joining portion comprising,
 (d) a cylindrical spacer disposed radially inwardly from said first portion,
said spacer being rigidly affixed to said disks and maintaining the axial spacing thereof and,
 (e) means cooperating with said first portion to hold said first portion between successive disks,
said first portion acting solely as a heat-shield for said spacer and being provided with cooling means in the form of axially-extending air passages and fins.

4. The composite member described in claim 3 wherein said first portion is constructed in segments adapted to be held between successive disks by said second portion, the segments being spaced apart circumferentially of the rotor to compensate for expansion due to heating up of the segments during rotor operation.

References Cited in the file of this patent

UNITED STATES PATENTS

| | | |
|---|---|---|
| 2,553,442 | Clark et al. | May 15, 1953 |
| 2,639,885 | Ledwith | May 26, 1953 |
| 2,749,086 | Lombard | June 5, 1956 |
| 2,751,189 | Ledwith | June 19, 1956 |
| 2,860,851 | Halford et al. | Nov. 18, 1958 |
| 2,869,820 | Marchant et al. | Jan. 20, 1959 |
| 2,973,938 | Alford | Mar. 7, 1961 |
| 2,996,280 | Wilson | Aug. 15, 1961 |

FOREIGN PATENTS

| | | |
|---|---|---|
| 563,458 | Germany | Oct. 20, 1932 |
| 468,862 | Italy | Feb. 6, 1952 |
| 1,183,718 | France | July 13, 1959 |